United States Patent Office 3,180,155
Patented Apr. 27, 1965

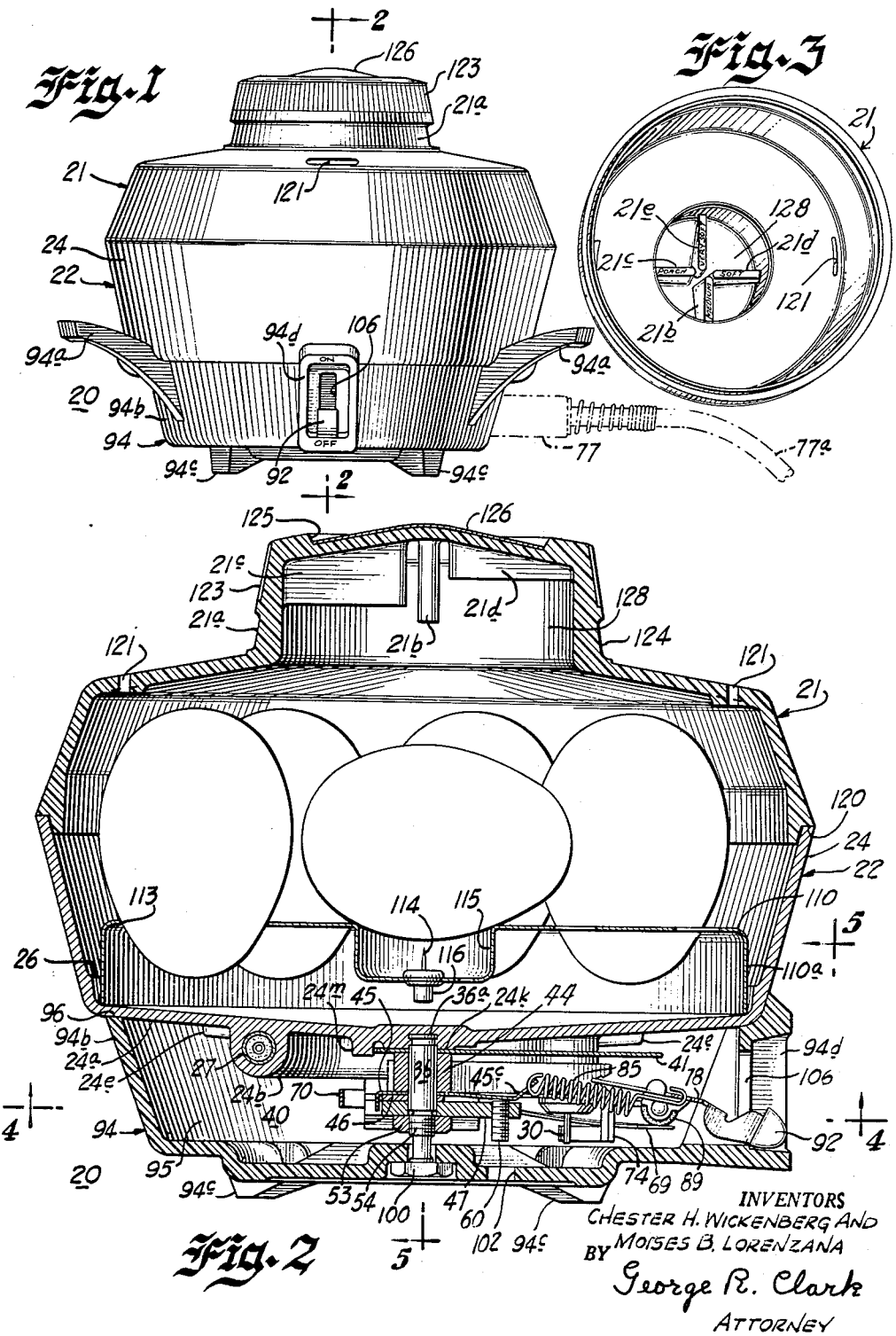

3,180,155
LIQUID MEASURING COVER
Chester H. Wickenberg, Elgin, and Moises B. Lorenzana, Glen Ellyn, Ill., assignors to Sunbeam Corporation, Chicago, Ill., a corporation of Illinois
Original application May 22, 1961, Ser. No. 111,809, now Patent No. 3,143,639, dated Aug. 4, 1964. Divided and this application Sept. 25, 1963, Ser. No. 311,459
2 Claims. (Cl. 73—426)

The present invention relates to an automatic heating device and more specifically to an automatic heating device for heating or in many cases cooking certain materials to a desired temperature or a desired degree. The present invention is an improvement on Jepson Patents 2,761,375 and 2,778,921, both assigned to the same assignee as the present application. Specifically, this application is a division of copending Wickenberg et al. application Serial No. 111,809, filed May 22, 1961, now Patent No. 3,143,639.

The aforesaid Jepson patents disclose heating devices commonly termed an egg cooker and a baby bottle warmer which have been extensively sold on the market for quite a number of years. In fact, these devices can be purchased in any city in the United States. Essentially these heating devices comprise a suitable vessel having associated therewith an electric heating element and a thermal responsive device for automatically terminating the heating or cooking operation when predetermined conditions have been obtained. Although these patented heating or cooking devices have been very successful, it would be desirable to provide an improved device retaining all the advantages set forth in the prior patents but wherein the heating portion of the same device may be used interchangeably as an egg cooker or a baby bottle warmer. It would be desirable to provide an improved temperature responsive device for automatically controlling the heating, which device is less expensive to manufacture and, yet, which is equally as foolproof in operation as the arrangements disclosed and claimed in the aforesaid Jepson patents.

Accordingly, it is an object of the present invention to provide a new and improved heating device.

It is another object of the present invention to provide an improved egg cooker, a major portion of which may be used to convert the device to a baby bottle warmer.

It is another object of the present invention to provide an automatic heating device of improved construction in which the heating is terminated dependent upon the time necessary to evaporate variable quantities of water or similar liquid.

Still another object of the present invention resides in the provision of an improved heating device either in the form of an egg cooker or baby bottle warmer of simple and compact construction requiring a minimum of parts and manufacturing expense and, yet, capable of giving many years of foolproof operation.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings in which:

FIG. 1 is an elevational view of the improved heating device of the present invention when used as an egg cooker with the temperature responsive control in the "off" position;

FIG. 2 is an enlarged sectional view taken on line 2—2 of FIG. 1; and

FIG. 3 is a perspective view showing the interior of the cover of the egg cooker of the present invention.

Briefly, the present invention, as more fully disclosed in the aforesaid Wickenberg et al. patent from which this application was divided, comprises a heating device employing a receptacle having an inclined bottom with electrical heating means associated therewith, and means for supporting eggs, in the event that the device is used as an egg cooker, or a baby's bottle, in the event that the device is used as a baby bottle warmer. The cover of the device, whether it be used as a baby bottle warmer or as an egg cooker, includes means for measuring the proper amount of water to be inserted into the vessel depending upon the end conditions desired, and when this water has all evaporated a bimetallic element forming a part of the thermal responsive means and responsive to the temperature of the bottom of the receptacle at the lowest level thereof cuts off the electric current supplied to the heating means. As long as any water is disposed in the vessel overlying the portion thereof to which the bimetallic element is responsive, the temperature will, of course, be limited to approximately the boiling temperature of water. Upon evaporation of all the water, the temperature rises rapidly to effect operation of the thermal or temperature responsive control device. As in one of the prior Jepson patents referred to above, an egg poaching tray may be used if it is desired to poach the eggs instead of boiling them. Whether the device is used to warm a baby's bottle, to boil eggs or to poach eggs, the same process of automatic heating is employed. An improved temperature responsive device is employed in which with a minimum of elements and a minimum of fastening means a very satisfactory, foolproof device is provided.

Referring now to the drawings and also to the drawings of parent Patent No. 3,143,639, there is illustrated a heating device specifically in the form of an egg cooker, a major portion of which, however, may be employed as a baby bottle warmer as clearly shown in the aforesaid Wickenberg et al. patent. The disclosure of this parent patent is incorporated by reference into this divisional application. The heating device is generally designated by the reference numeral 20. The heating device 20 comprises a cover 21 and a lower heating vessel and base assembly generally designated by the reference numeral 22, which element 22 is identical whether used as a baby bottle warmer or as an egg cooker. When the device is used as a baby bottle warmer, then instead of the cover 21, a cover, described in greater detail in the aforesaid Wickenberg et al. patent and in many respects quite similar to the corresponding cover of Jepson patent No. 2,778,921, is employed. The cover 21 and the baby bottle warmer cover referred to above are each adapted to cooperate with the identical vessel and base assembly 22, and by associating the proper cover therewith, the device becomes an egg cooker or a baby bottle warmer, respectively.

The vessel and base assembly 22 essentially comprises a temperature controlled electric heating device and is described in detail hereinafter prior to considering its use either as an egg cooker or as a baby bottle warmer. As clearly shown in the drawings, the vessel and base assembly 22 preferably comprises a vessel portion 24 formed as an aluminum die casting or the like in the shape of a relatively shallow, tapered wall, circular, open top container having a bottom 24a integrally formed with the somewhat tapered side walls. The bottom 24a is indicated as having a uniform slope toward the center so that the lowest level of the bottom 24a is essentially at the center of the bottom 24a. It will be appreciated that to utilize any cooking device to produce hard boiled eggs that it is necessary to cook them a relatively long time and, if desired, the vessel 22 may be provided with a suitable indicating means to indicate the depth of water necessary to be evaporated in the vessel 24 to produce hard boiled eggs. In a device built in accordance with the present invention, an annular ledge 26, clearly shown in FIG. 2 of the drawings, was provided for this purpose. If desired, the interior of the vessel 24 may be embossed with suitable indicia indicating that for hard boiled eggs the vessel should be filled to the level of the circular ledge 26.

For the purpose of supplying the necessary heat to cook any eggs supported in the vessel assembly 22 or to heat a baby's bottle in the event that it is so used, there is provided a suitable electrical heating element generally designated at 27. The heating element 27 is preferably one of the well known sheathed type which conventionally comprises an outer metal sheath within which is disposed a suitable length of resistance wire such, for example, as Nichrome wire coiled in the form of a helix. Surrounding this coiled resistance wire within the sheath is a generally refractory composition commonly formed of fused magnesium oxide which centers the resistance element and which, furthermore, is a good heat conductor and, yet, a good electrical insulator. Preferably the sheathed heating element 27 is bent into the form of a substantially one-turn ring which is sometimes referred to as a C configuration and, as illustrated in the drawings, this C-shaped heating element is cast within a raised rib 24b integrally formed with the vessel 24 and the bottom 24a thereof, thus assuring that the heating element 27 is in intimate heat exchange relationship with the vessel 24. Preferably the ends of the sheathed heating element 27 are connected to suitable rigid electrical terminals such as 30 which project from the ends of the sheathed heating element 27.

For the purposes which is fully disclosed in the parent patent, the underside of the vessel 24 is provided with a plurality of lugs such as 24e integrally formed with the bottom 24a during the casting operation of the vessel 24.

For the purpose of providing a good heat transmitting member from the vessel 24 to a suitable temperature responsive device, the vessel 24 is provided with a central depending lug 24k, which preferably has a machined surface to make good contact with a suitable bimetallic element described hereinafter. Moreover, in order to permit assembly of the various elements comprising the vessel 24, there is provided a stud 36 projecting downwardly from the bottom 24a of the vessel 24 having a portion 36a providing interlocking means thereon so that it may be cast into the bottom of vessel 24. As illustrated, the stud 36 is concentric with the heat transmitting lug 24k. For a purpose fully disclosed in the parent patent, an additional lug 24m is provided adjacent the lug 24k.

In accordance with the invention disclosed in the parent patent there is provided a thermal or temperature responsive device generally designated by the reference numeral 40 which comprises a temperature responsive switch mechanism and associated electrical circiut relating the same to the heating element 27. This mechanism is secured to the vessel 24 in a very simple manner. It will be apparent that the stud 36 provides a fastening means for securing the entire thermal responsive device and electrical means in position in cooperation with various lugs and the like already described. An essential element of the thermal or temperature responsive device 40 comprises a bimetallic element or thermostat blade 41 of the cantilever type which is provided with an opening at the fixed end thereof to receive the stud 36. It is furthermore provided at the fixed end with a notch for receiving the lug 24m. The machined surface 35 of the lug 24k then provides intimate contact with a substantial portion of the bimetallic element 41 to insure that such element is directly responsive to the temperature of the bottom 24a of the vessel 24. It will be apparent that the notch or cut away portion is provided so as not to interfere with the deflection of the bimetallic element. Actually the high expansion side of the bimetallic element 41 is in contact with the machined surface 35 of lug 24k so that the bimetallic element 41 tends to deflect away from the bottom 24a of the vessel 24 upon heating thereof.

The temperature responsive device 40 in addition to the bimetallic element 41 includes a bracket spacer 44, a pivot bracket 45, a terminal bracket 46 and an adjusting screw bracket 47, each of which is provided with an opening for receiving the stud 36. These elements are assembled on the stud 36 in stacked relationship. Thus, the bimetallic element 41 is disposed against the bottom of the vessel 24, with the successive elements comprising the bracket spacer 44, the pivot bracket 45, the terminal bracket 46 and the adjusting screw bracket 51 following in that order in stacked relationship. All of these elements are held in this stacked relationship, effectively clamped together, by a nut 53 engaging a first threaded portion 54 of stud 36.

Considering now these elements in more detail, the bracket spacer 44 is merely a cylindrical member to give a desired spacing. The pivot bracket 45 is a channel shaped member which extends between spaced lugs formed on the raised rib 24b containing the heating element 27 and substantially fills the space between these lugs, thus determining the positioning thereof. The pivot bracket 45 includes a depending ear, a pair of spaced pivot arms and a central deflectable spring retaining tab or finger 45c. The flanges of the channel shaped pivot bracket 45 project toward the bottom 24a of the vessel 24 and substantially enclose the bracket spacer. The terminal bracket 46 includes a notch 55 for receiving the ear of the pivot bracket 45 and, thus, orientating the pivot bracket and the terminal bracket with respect to each other at an angle of ninety degrees. It will be appreciated that with this arrangement the stud 36 and nut 53 clamp the terminal bracket 46 to the bottom of the vessel, against rotational movement relative to the axis of the stud 36. The adjusting screw bracket 47 includes a tapped opening for receiving an adjusting screw 60 which is adapted to engage the spring supporting finger or tab 45c of the pivot bracket 45 and effectively change the position of this finger 45c relative to the bottom of the vessel 24. Preferably the adjusting screw 60 is provided with a screw driver slot 59 (not shown).

In order to supply the heating element 27 with electrical energy in a controlled manner there are provided a pair of terminal studs which are supported in an insulated manner from the flange of the terminal bracket 46. An electrical U-shaped conductor 70 so shaped to extend around the other elements defining temperature responsive device 40 is provided to make electrical connection with one terminal of the heating element 27. The conductor 69 is essentially a switch spring blade formed of stainless steel or the like connected to one of the terminal studs (not shown). The free end of the spring blade 69 supports an electrical contact whereby the spring blade 69 might be considered a movable switch arm.

For the purpose of providing a cooperating contact so as to provide a complete switch, there is provided a stationary contact mounted on a rigid conductor 74 welded or otherwise suitably secured to the terminal 30 of the heating element 27. The stationary contact is so positioned that the inherent resilience of spring blade 69 tends to bias movable contact into contacting engagement with stationary contact. It will be apparent that the heating device 20 is provided with standard male bayonet type terminals for making ready electrical connection with a female type terminal plug well known in the art and shown in dotted lines in FIG. 1 designated by the reference numeral 77. The conventional cord connector 77a is associated with terminal plug 77. Unless means are provided to separate the contacts, they are normally closed due to the inherent resilience of the spring blade 69, and thus when cord connector 77a is connected to a source of electrical energy and to the terminal studs, electrical energy is supplied to the heating element 27.

In order to terminate the heating operation, and as clearly shown in the parent patent, means are provided to move the relatively movable contact out of contacting engagement with stationary contact when predetermined temperature conditions of the bottom 24a of the vessel 24 are attained. To this end there is provided a switch lever 78 of somewhat Y-shaped configuration having two arms of the Y adapted to make pivotal connection with the arms of the pivot bracket 45.

In order to hold the Y-shaped switch lever 78 in pivotal engagement with the arms of the pivot bracket 45, there is provided a tension spring 85 having a hook at one end thereof for engaging with a cooperating opening defined in the deflectable finger 45c of pivot bracket 45. The other end of tension spring 85 is provided with a hook receivable in an opening defined in the switch lever 78. With this arrangement the switch lever 78 is effectively an over center device which has two stable positions.

So that the snap acting movement of the switch lever 78 actuates the switch in response to deflection of the bimetallic element 41, the switch lever 78 is provided with an ear engageable by bimetallic element 41. The switch lever 78 is also provided with an insulating switch actuating member 89 which is suitably secured to an ear of the lever 78. This insulating switch actuating member 89 is adapted to cause opening of the switch.

It will be appreciated that the temperature responsive device 40 should be provided with means for manually closing the switch when the heating operation has been terminated. To this end the switch lever 78 is provided with an arm to which may be secured a suitable manual actuating knob 92. From the above description is will be appreciated that the thermal responsive device 40 is a very simple device and is assembled to the vessel 24 by the use of a single stud 36 and the welding of the conductors to the terminals such as 30. All other parts are interrelated in a simple manner without the requirement of any fastening means and, yet, the entire mechanism is assembled in a foolproof manner and properly orientated with respect to the vessel 24.

For the purpose of housing the temperature responsive device 40 and at the same time providing an insulated support for the vessel 24 so that the heating device may be supported from any surface without damage thereto, there is provided an insulating base generally designated at 94 which with the vessel 24 and the temperature responsive device 40, described hereinafter, defines the vessel and base assembly generally designated at 22. As illustrated, the base 94 is preferably molded from an insulating phenolic material and is provided with a pair of diametrically opposed projecting ears 94a which define handles for supporting and carrying the cooking device 20. Essentially the base 94 comprises a cup-shaped cylindrical portion 94b defining a chamber 94 therein from the top edges of which the handles 94a project. The annular top edge of this cup-shaped portion 94b designated as 96 abuts against the bottom 24a of the vessel 24.

To secure the base 94 to the vessel 24, the cup-shaped portion 94b is provided at the center bottom thereof with an opening through which the stud 36 may project. The bottom of the base 94 is furthermore provided with a recess concentric with the opening 98 to receive a nut 100 engageable with a threaded portion defined on the stud 36 and spaced from the threaded portion 54.

So that adjustment of the adjusting screw 60 may readily be made when the base 94 is assembled to vessel 24, the bottom of the insulating support 94 is further provided with an opening 102 aligned with the screw 60. A suitable tool such as a screw driver may be inserted through the opening 102 and engage a screw driver slot defined in the adjusting screw 60. Preferably the bottom of the insulating base 94 further includes a plurality of spaced legs 94c.

In order to accommodate the switch lever 78 the base 94 is provided with a slotted opening 106 through which the arm of switch lever 78 may project. Preferably a suitable projecting flange 94d integrally molded with the base 94 surrounds the slotted opening and encloses the manually actuatable switch button 92 so that it may readily be actuated by the user but may not be inadvertently actuated by accidentally brushing against the same. Suitable indicia such as "On" and "Off" to indicate the closed and open condition of the switch is preferably provided on the frame 94d as clearly shown in FIG. 1 of the drawings.

As was mentioned above, the vessel and base unit 22 may be used alternatively as the heating device for an egg cooker or as the heating device for a baby bottle warmer. When the device is used as an egg cooker there preferably is employed an egg rack 110, and the cover 21. The egg rack is preferably a disk of sheet metal having a depending outer flange 110a adapted to rest on the bottom 24a of the vessel 24. The disk 110 is provided with a plurality of spaced openings 113 to receive and support eggs in a manner clearly indicated in FIG. 2 of the drawings. It will be appreciated that in boiling eggs it is preferably desirable to pierce the shell at the point where the air space in the egg normally occurs so that any pressure developed during the cooking operation will be permitted to escape through this opening. Such a piercing device indicated in the form of a needle 114 is preferably supported in a depending recess 115 defined in the egg rack 110. As illustrated the piercing needle 114 is suitably supported in a needle mount 116 which in turn is supported at the bottom of the recess 115. When all the eggs have been pierced and supported in the egg rack openings 113 as indicated in FIG. 2 of the drawings, an additional egg may then be disposed above the recess 115 as clearly indicated. Thus, a substantial number of eggs may be simultaneously cooked with a device built in accordance with the present invention.

In accordance with the present invention the cover 21 for the heating device 20 when used as an egg cooker is preferably also molded from a suitable moldable material such as a melamine resin or the like. Preferably, cover 21 is in the form of an inverted dish with a peripheral recess 120 defined around the vessel engaging edge to receive the open top of the vessel 24 as clearly shown in FIG. 2 of the drawings. Preferably the cover includes a pair of elongated openings or steam escape passageways 121 for the escape of steam during the cooking operation.

In order that the cover 21 may readily be grasped by the hand of the operator, it is provided with a handle portion of reduced cross section designated at 21a. To facilitate grasping of the handle 21a it is illustrated as being provided with a knurled surface 123, and if desired, with a circumferential groove 124 beneath this knurled surface to permit the tips of the operator's fingers to grasp the same. In a device built in accordance with the present invention the top of the hand grip portion 21a was provided with a recess 125 to receive therein a suitable nameplate 126 having any desired indicia thereon.

In accordance with the present invention the handle portion 21a is hollow as indicated in FIGS. 2 and 3 of the drawings to define a measuring chamber 128 therein for measuring varied quantities of water to be placed in the vessel 24 to determine the length of the heating or cooking operation. In order to determine specific quantities of liquid to be measured in the chamber 128, there are integrally molded with the cover 21 a plurality of radial fins of different vertical extent specifically designated as 21b, 21c, 21d and 21e; these fins or vanes varying in height with 21b being the fin of the maximum vertical extent, 21c the next, 21d the next and 21e the fin of the minimum vertical extent. This is clearly evident from FIGS. 2 and 3 of the drawings. Preferably corresponding indicia may be molded on the depending ends of the fins or vanes 21b, 21c, 21d and 21e. As indicated in the drawings, vane 21b has the indicia MEDIUM molded thereon, vane 21c has the indicia POACH molded thereon, vane 21d has the indicia SOFT molded thereon and vane 21e has the indicia VERY SOFT molded thereon. When water to the height of any one of these vanes is placed in the measuring chamber 128 and then this liquid is inserted in the vessel 24 which in turn has its heating element 27 connected to a source of electrical power, the condition of the cooked eggs which will result when the device automatically terminates the cooking operation will be that indicated by the indicia on the vane which determined the height of the liquid. As was mentioned earlier, for hard boiled eggs the cooking vessel itself has the shoulder 26 therein. In the event it is desired to poach eggs preferably a poaching tray, which may be similar to that disclosed in the aforesaid Jepson Patent 2,761,375, may be used. When such a poaching tray is used, which is preferably a compartmented tray, it will be placed upon the egg rack 110 and supported directly thereon.

In view of the detailed description included above, the operation of the egg cooker and the baby bottle warmer, principal portions of which are identical, will readily be understood. An improved temperature responsive device has been provided which is simple and inexpensive and foolproof in operation.

While there has been illustrated and described several embodiments of the present invention, it will be understood that numerous changes and modifications will occur to those skilled in the art and it is aimed in the appended claims to cover all such changes and modifications as fall within the true spirit and scope of the present invention.

What is claimed as new and desired to be secured by Letters Patent of the United States is:

1. For use with an electric heating device comprising a vessel portion a cover including an integral hollow knob portion projecting from the center of said cover, said knob portion defining a liquid measuring chamber when said cover is in inverted position, and means integral with said knob portion comprising radial fingers of different heights extending into said chamber.

2. The combination of claim 1 wherein said cover is molded from a plastic material.

References Cited in the file of this patent
UNITED STATES PATENTS

| | | | |
|---|---|---|---|
| 522,969 | 7/94 | Connally | 73—427 |
| 2,040,649 | 5/36 | Fortes | 99—440 |
| 2,402,883 | 6/46 | Gavalis | 99—440 |
| 2,931,230 | 4/60 | Lowery | 73—427 |

RICHARD C. QUEISSER, *Primary Examiner.*

JEROME SCHNALL, *Examiner.*